May 10, 1927.
J. T. TERRY
PROCESS FOR TREATMENT OF ORES
Filed Sept. 7, 1922
1,627,582
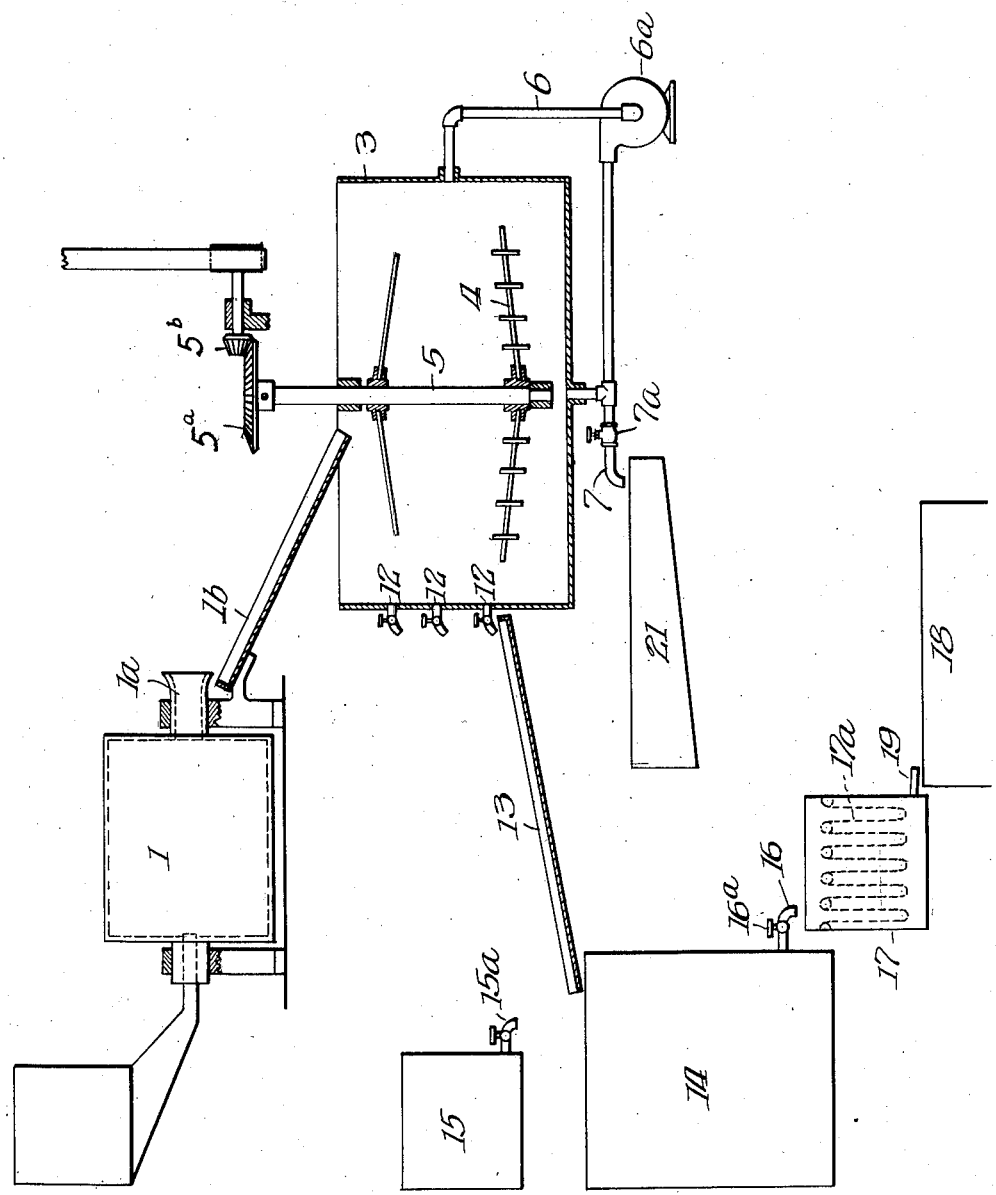
Inventor:
Joseph T. Terry,
By Sheridan, Jones & Sheridan
attys.

Patented May 10, 1927.

1,627,582

UNITED STATES PATENT OFFICE.

JOSEPH T. TERRY, OF LEADVILLE, COLORADO, ASSIGNOR OF ONE-HALF TO THOMAS H. SHERIDAN, OF CHICAGO, ILLINOIS.

PROCESS FOR TREATMENT OF ORES.

Application filed September 7, 1922. Serial No. 586,561.

This invention relates to improvements in processes for the treatment of ore, and has for its object the treatment of ores which it has been hitherto impossible to concentrate successfully or to concentrate with sufficient economy to render concentration feasible and practical.

My process contemplates, briefly, the subjection of ore containing, for example, silver—which may occur with or without copper and lead or other metals—to the action of a solvent consisting of metal ammonium salts in solution, together with an alkali hyposulphite, thereby dissolving the silver, and possibly other metals, as copper and lead in some occurrences, thereafter separating the liquor from the remainder of the pulp by filtration, decanting or the like, thereafter precipitating the dissolved metals by any suitable method, as, for example, the addition of a metal sulphide, then removing the precipitated metals from the liquor. As a corollary or subsidiary to my main process, I may treat the residue or the original pulp solution by suitable methods of concentration, as flotation, gravity treatment or the like, before or after the solution of the other metals, to recover the naturally occurring metal sulphides or other undissolved metals susceptible to such recovery.

In the accompanying drawing I have diagrammatically illustrated apparatus for the carrying out of my new process.

In the drawings—

Figure 1 indicates a ball mill suitable for crushing the ore and having a discharge outlet 1ª through which the finely ground pulp may be discharged to a trough or launder 1ᵇ for conveyance to an agitation tank A³, in which is provided a suitable rotatable stirrer 4, carried by the shaft 5, which in turn is rotated by the beveled gears 5ª, 5ᵇ in a conventional manner. A circulatory system 6 is provided, including a pump 6ª, and is intended to circulate the pulp and solution in the tank 3. A discharge pipe 7 leads from the circulatory system, being provided with a shut-off valve 7ª, to permit the discharge of the contents of the tank 3. Suitable take-off discharges 12 are provided at various heights in the side of the tank, to permit the discharge of the clear solution, as it settles, from different levels into a launder or trough 13, through which the solution is conveyed to a precipitating tank 14. Located above the precipitating tank is the precipitant tank 15, having a discharge duct 15ª to regulate the discharge of the precipitant from the tank 15 into the tank 14. A discharge outlet 16 leads from the tank 14 and is provided with a control valve 16ª for intermittent discharge of the precipitate and liquor into the filter box 17, in which are provided webs 17ª, of canvas, burlap, or other suitable filter material, which may be readily removed for recovery of the precipitated metals.

A discharge pipe 19 leads to a collection tank or vat 18, which may be a storage tank or communicate with such, in the event it is desired to preserve the liquid for re-use or regeneration.

In the carrying out of my process, for example, ore containing silver, or silver and copper, or silver and lead, or silver and other metals, is put into the ball mill, where it is ground or crushed into a suitable pulp in the presence of water and a metal ammonium salt, as, for example, copper ammonium salt, and an alkali hyposulphite, such as sodium-hyposulphite, sometimes technically called sodium-thiosulphate. As the ore is ground to the proper degree, it is delivered into the agitating tank 3, in which the ore particles are maintained in a constant state of suspension and circulation, assuring intimate contact of all of the metalliferous particles with the solvent for a desired period of time, which necessarily will vary according to the character of the ore, quality of recovery desired, and other conditions. It is obvious that a plurality of tanks may be provided to permit continuous, or substantially continuous, operation of the grinding or crushing elements, and it may also be possible to operate, with a properly designed tank, the process continuously. When the agitating tank is being operated intermittently the liquor may be drawn off through the various discharge ports 12, after being allowed to settle, and when substantially all the clear solution has been decanted through the launder 13 into the precipitating tank 14, the remaining contents of the tank 3—including the gangue and undissolved metalliferous particles, etc.— may be discharged through outlet 7 into a flotation cell 21, shown as of the Callow type, wherein the pulp is subjected to flotation treatment well known to those skilled in the art, whereby undissolved metalliferous particles, especially those in sulphide ore form, may be recovered in a well known manner. It is obvious that other types of concentration apparatus may be employed for this corollary step, and I am merely illustrating one familiar type of apparatus.

A precipitant, such as sodium sulphide, zinc hydrosulphite, metallic zinc, or the like, is added to the clear solution in the precipitating tank 14, as needed, and the precipitate, which contains silver, copper, and the like, is then delivered into the filtration box 17, where the precipitate is retained by the web 17ª, which may be removed with its load from time to time. The filtered liquor is conveyed into the tank 18, where it may be retained for regeneration or re-use as desired.

I contemplate the treatment of gold, as well as silver, copper, lead, and other metals mentioned above, and do not wish to be restricted in the application of my process to metals specifically described or mentioned above. Nor do I wish to be restricted to the specific chemical compounds used in my process, as mentioned above, as typical, as I am aware that metallic salts, other than copper ammonium salts, may be used; such as zinc ammonium sulphate or chloride, or iron ammonium sulphate or chloride, in fact, metal ammonium salts which are not decomposed by sodium hyposulphite; and I am also aware that other hyposulphites than that of sodium are available for use, also other precipitants for precipitation.

In the carrying out of my process as described, where copper ammonium salts are used, I may perform the same by dissolving copper sulphate in water and neutralizing or making the solution ammoniacal by the addition of aqua ammonia or ammonium carbonate. I may also form the copper ammonium salt in situ, where the ore contains copper, by adding an alkali-hyposulphite and aqua-ammonia, or ammonium compound, as ammonium carbonate.

It may also be desirable in the practice of my process to wash the residue of the decanting operation one or more times, in order to insure the removal of all the dissolved metals, treating the liquor thus obtained as the original solution is treated.

As an illustration of the practice of my process and the quantities of ingredients used, I would state that in one test 500 grammes of oxidized ore, assaying 9.8 ounces of silver per ton, was ground in a small ball mill with 2000 cubic centimeters of water containing, in solution, 20 grammes of sodium hyposulphite, 1 gramme of copper sulphate, and 1½ cubic centimeters of aqua-ammonia (28% $NH_3$). The mixture was agitated in an open vessel for seventy two hours, after which the solution and solids were separated, the treated ore dried and assayed, the assay showing but 1.7 ounces of silver in the tailing, indicating an extraction of 82.6% of the total silver.

In another test ore assaying 8 ounces of silver to the ton and .5% copper to the ton was ground and 200 grammes of the ore were mixed with 500 cubic centimeters of a water solution containing .2% copper sulphate, 3 cubic centimeters of aqua-ammonia (28% $NH_3$) and 5 grammes of ammonium sulphate. The mixture was agitated for ten hours, the liquor decanted, and the pulp dried and assayed. The tailing assayed 2 ounces of silver to the ton and two-tenths of 1% copper, this test showing in a relatively short period of agitation some 75% recovery of silver and 60% recovery of copper.

In another test ore assaying 7.6 ounces of silver per ton and 4½% of lead was subjected to a rougher and cleaning concentration with a Janney flotation machine, and, after the removal of the concentrates and middlings, the tailing assaying 4.4 ounces of silver per ton and containing a small amount of lead was agitated eight hours with a solution of 2000 cubic centimeters of water, 20 grammes of sodium hyposulphite and 1 gramme of copper dissolved in 1½ cubic centimeters of aqua-ammonia. After the agitation the solution was decanted and the tailing dried and assayed, the assay indicating .5 of an ounce of silver, showing a silver recovery of slightly less than 90%. The success of this last test will be appreciated by those skilled in the art, in view of the fact that it was conducted upon a tailing containing but approximately 52% of the original silver content of the ore.

It will be appreciated that proportions of the ingredients and the amount of agitation will vary to suit the needs of different ores, and the necessary ingredients and mill operations can readily be determined from laboratory tests, as is the practice in this art.

I do not wish to be restricted to the steps and ingredients described in the above specification, except as defined in the appended claims.

What I claim is:

1. A process of the class described, consisting in subjecting ground ore to the action of a solution containing a metal ammonium salt and an alkali-hyposulphite, and precipitating the dissolved metals.

2. A process of the class described consisting in subjecting ground ore to the action of a solution containing a metal ammonium salt and an alkali-hyposulphite, and precipitating the dissolved metals in sulphide form.

3. A process of the class described consisting in subjecting ground ore to the action of a solution containing a metal ammonium salt and an alkali-hyposulphite, and precipitating the dissolved metals by adding a precipitant.

4. A process of the class described, consisting in subjecting ground ore to the action of a solution containing a metal ammonium salt and an alkali-hyposulphite, and precipitating the dissolved metals by adding an alkali-sulphide.

5. A process of concentrating ore consisting in subjecting the ore to the action of a solution of a metal ammonium salt and an alkali-hyposulphite, thereafter removing the resultant solution, and precipitating the metal content from said solution.

6. A process of concentrating ore consisting in subjecting the ore to the action of a solution of a metal ammonium salt and an alkali-hyposulphite, thereafter removing the resultant solution, and precipitating the metal content from said solution by the addition of a precipitant.

7. A process of concentrating ore consisting in subjecting the ore to the action of a solution of a metal ammonium salt and an alkali-hyposulphite, thereafter removing the resultant solution, and precipitating the metal content from said solution by the addition of an alkali-sulphide.

8. A process of concentrating ore consisting in subjecting the ore to the action of a solution of copper ammonium salt and an alkali-hyposulphite, and thereafter precipitating the dissolved metals.

9. A process of concentrating ore consisting of subjecting the ore to the action of a solution of metal ammonium salt and sodium-hyposulphite, and thereafter precipitating the dissolved metals from the solution.

10. A process of concentrating ore consisting of subjecting the ore to the action of a solution of copper ammonium salt and sodium-hyposulphite, and thereafter precipitating the dissolved metals from this solution.

11. A process of concentrating ore consisting in grinding the ore in the presence of a solution of a metal ammonium salt and an alkali-hyposulphite, and thereafter precipitating the dissolved metals from the solution.

12. A process of concentrating ore consisting in subjecting the ore to the action of a solution of a metal ammonium salt and an alkali-hyposulphite, thereafter separating the solution from the residue, and thereafter concentrating the residue to recover the naturally occurring metals and metallic compounds remaining therein.

13. A process of concentrating ore consisting in subjecting the ore to the action of a solution of a metal ammonium salt and an alkali-hyposulphite, thereafter separating the solution from the residue, and thereafter subjecting the residue to a flotation operation to recover undissolved metals and metallic compounds.

In testimony whereof, I have subscribed my name.

JOSEPH T. TERRY.